United States Patent [19]

Hayashi et al.

[11] 4,453,818

[45] Jun. 12, 1984

[54] METHOD OF AUTOMATICALLY ADJUSTING FOCUS CONDITIONS

[75] Inventors: Asao Hayashi, Hachioji; Kenichi Oinoue; Masahiro Aoki, both of Tokyo; Junichi Nakamura; Masatoshi Ida, both of Hachioji, all of Japan

[73] Assignee: Olympus Optical Company, Ltd., Tokyo, Japan

[21] Appl. No.: 446,255

[22] Filed: Dec. 2, 1982

[30] Foreign Application Priority Data

Dec. 4, 1981 [JP] Japan ................................. 56-195384

[51] Int. Cl.³ .............................................. G03B 3/10
[52] U.S. Cl. ..................................................... 354/406
[58] Field of Search ..................................... 354/25, 31

[56] References Cited

U.S. PATENT DOCUMENTS 4,341,953 7/1982 Sakai et al. ...................... 354/25 X
4,411,504 10/1983 Kinoshita et al. ..................... 354/25

Primary Examiner—Michael L. Gellner
Attorney, Agent, or Firm—Parkhurst & Oliff

[57] ABSTRACT

A method of automatically adjusting focus conditions of photographic optical system is disclosed. In the method at least a part of optical image formed on a predetermined focal plane by an optical system is projected onto first and second photocell arrays in the front and the rear of a surface conjugated to the predetermined focal plane, and onto at least one of other photocell arrays arranged between the first and second photocell arrays. Outputs of first, second and other photocell arrays are arithmetically operated in accordance with respective given evaluation functions thereby obtaining first, second and other evaluation values. These evaluation values are compared with each other and the optical system is intermittently shifted in the optical axis direction with first or second moving step in the case of decision from the compared result that the optical system is positioned within or outside a predetermined range including the in-focused position.

12 Claims, 10 Drawing Figures

FIG_1
PRIOR ART
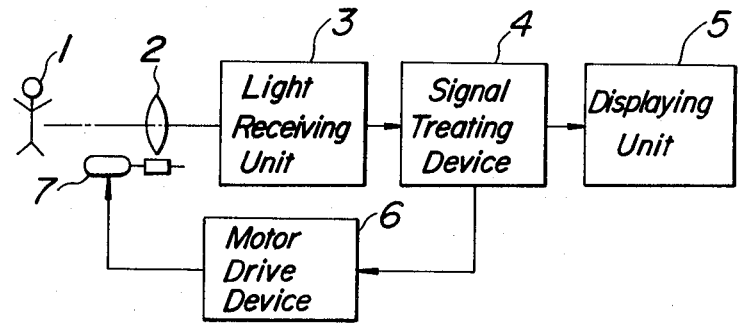
FIG_2
PRIOR ART
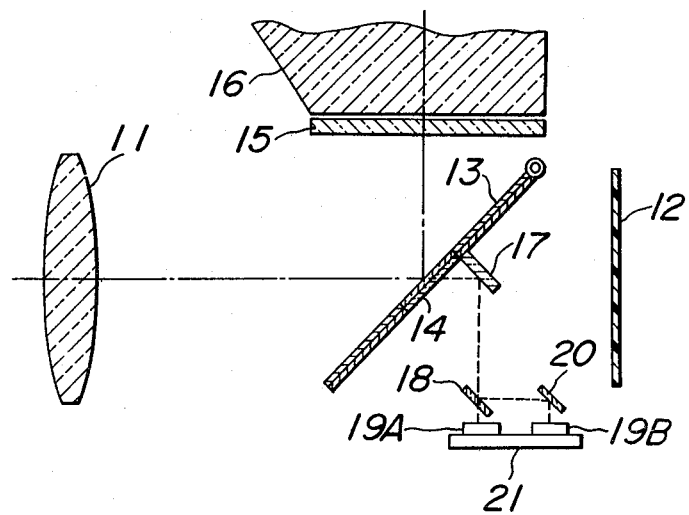

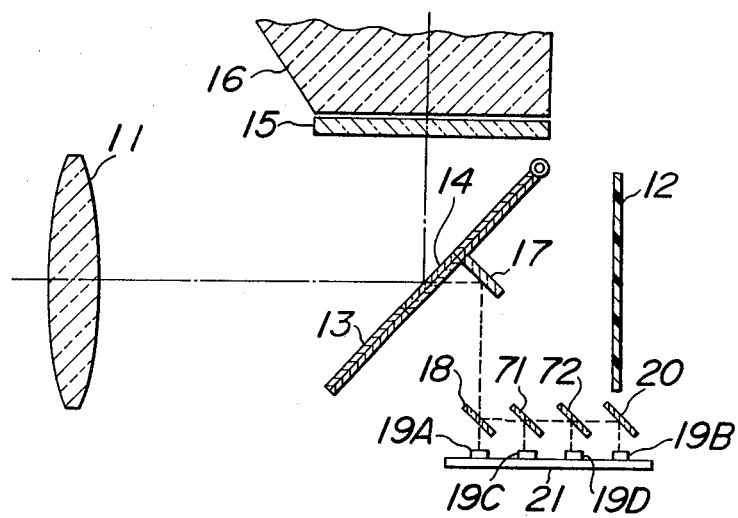
FIG_9
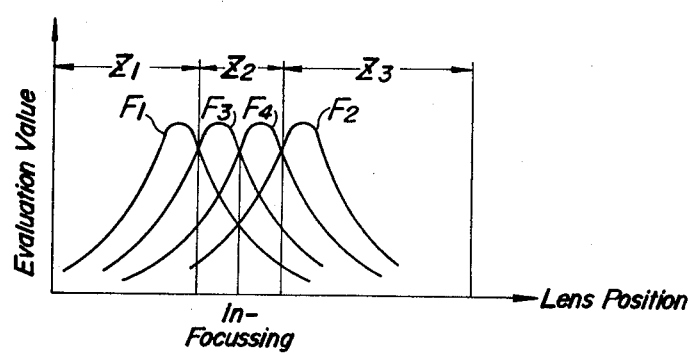
FIG_10

METHOD OF AUTOMATICALLY ADJUSTING FOCUS CONDITIONS

BACKGROUND OF THE INVENTION

The present invention relates to a method of controlling automatic focusing for use in a still camera, cine-camera, photomicrography taking device or the like.

There has been developed a plurality of devices for automatically adjusting focus conditions of photographic optical system.

FIG. 1 shows a fundamental construction of such an automatic focus control or adusting device. An image of an object 1 to be photographed is formed on a light receiving unit 3 through an object lens 2, a photoelectrically converted output of the light receiving unit 3 is properly treated in a signal treating device 4 thereby deciding or evaluating focusing conditions of an image formed on the unit 3, that is, front focus, in-focus and rear focus conditions, and the evaluated result is displayed on a display unit 5. If the decided result is the front focus condition or the rear focus condition a lens drive motor 7 is rotated in the given direction through a motor drive unit 6 in accordance with these focus conditions thereby moving the lens 2 in an optical axis direction by 1 pitch, thereafter focusing conditions are again decided thereby automatically controlling the lens 2 at the in-focusing position by repeating the above operations.

As a method of deciding focusing conditions based on the photoelectrically converted output obtained by the light receiving unit 3, for example, there is proposed a method of detecting defocused image which uses an evaluation function for calculaing for example defocused amount of image. In the defocused image detecting method, for example, as the light receiving unit 3 use is made of two arrays of light receiving elements arranged in the front and the rear of conjugate surface to predetermined focal plane of the lens 2 at equidistant position so as to receive the same image, photoelectrically converted outputs of these two photocell arrays are arithmetically operated in accordance with evaluation function thereby obtaining evaluation value representing defocused amount of each image, these evaluation values are compared to decide focusing conditions such as front focusing, in-focusing and rear focusing conditions.

FIG. 2 is a diagram showing construction of conventional optical system in a single-lens reflex camera which adopts such a defocused image detection method. In FIG. 2 the control protion of a quick return mirror 13 arranged in an optical path formed between an objective lens 11 and a film 12 is formed by a half mirror 14, the light beam reflected by the half mirror 14 is led to an inspection optical system comprising a focusing screen 15 and a pentaprism 16, the light beam transmitted through the half mirror 14 is led downwards by a reflecting mirror 17 provided to the rear surface of the quick return mirror 13, and the downward led beam is transmitted through a half mirror 18 to lead on a photocell array 19A and the light beam reflected by the mirror 18 is reflected by a total reflection mirror 20 to lead another photocell array 19B which is placed on same substrate 21 as the photocell array 19A. The photocell arrays 19A, 19B ae displaced in the front and the rear of optically conjugate surface to the film 12 with equidistant position, image of same portions of the object to be taken is projected on both photocell arrays 19A, 19B, the photoelectrically converted output of each photocell array is arithmetically operated according to predetermined evaluation function to obtain evaluation value representing defocused amount of image thereby deciding focusing conditions of front focus, in-focus and rear focus based on the evaluation value. As to evaluation function if the output of ith element in photocell array is $X_i$, for example, the sum from maximum value of $|X_i - X_{i-1}|$ to predetermined numberth or the like is used.

FIG. 3 shows a relation between the lens position and respective evaluation values obtained by arithmetically operating the output of photocell arrays 19A and 19B based on the evaluation function. In FIG. 3 a curve $F_1$ represents an evaluation value of photocell array 19A and a curve $F_2$ represents an evaluation value of photocell array 19B. Respective evaluation values $F_1$ and $F_2$ of photocell arrays 19A and 19B have maximum value when in-focusing condition is obtained just on respective photocell arrays 19A and 19B and the evaluation values of both photocell arrays are equal with each other when in-focusing condition is obtained on the film 12. Respective evaluation values $F_1$ and $F_2$, therefore, are obtained at any position of the lens 11, and compared with each other thereby deciding the front focus condition in the case of $F_1 > F_2$, the in-focusing condition in the case of $F_1 = F_2$, and the rear focus condition in the case of $F_1 < F_2$, so that automatic focus adjusting can be performed according to the decided result by moving the lens 11 close to the short distance side (+ direction) in the case of $F_1 > F_2$ or close to the long distance side $\infty$ (− direction) in the case of $F_1 < F_2$.

In the above focus adjusting method, however, focusing conditions $F_1 > F_2$, $F_1 < F_2$ can be decided, but the moved distance of the lens cannot be obtained. Considering security of in-focusing precision, therefore, the lens 11 is moved in stepwise with moving amount within focal depth thereby obtaining evaluation values $F_1$ and $F_2$ each time resulting in a decision of the focusing condition. This cycle is repeated. However the time required for one decision cycle including stepwise moving time for the lens takes from several tens of ms to several hundreds of ms according to brightness of the object so that when a standard lens of focal length 50 mm, F number 1.4, focal depth 80 μm, and total lens moving distance 7.5 mm is used as the lens 11, if in-focusing position is placed at close distance of 7 mm with lens moving amount from the $\infty$ side and current lens position is placed at $\infty$ position, the time required to move the lens 11 to the in-focused position takes $(7/0.07) \times 0.1 = 10$ (sec) if lens moving amount of one step is 70 μm. This time is not practically used.

SUMMARY OF THE INVENTION

It is an object of the present invention to eliminate the above described disadvantages of the conventional automatic focusing adjusting method.

It is another object of the present invention to provide a method of automatically adjusting focusing capable of moving the photographic optical system at in-focusing position with very short time.

According to the present invention there is provided a method of automatically adjusting focus conditions comprises receiving at least a part of an optical image formed on a predetermined focal plane by an optical system onto first and second light receiving means each including photocell array arranged in the front and the rear of a surface conjugated to the predetermined focal plane and onto a third light receiving means arranged between the first and second light receiving means, respectively, arithmetically operating outputs of first, second and third light receiving means in accordance with respective given evaluation functions thereby obtaining first, second and third evaluation values, comparing first, second and third evaluation values with each other, intermittently shifting or moving the optical system in the direction of optical axis with a first moving step in the case of decision from the compared result that the optical system is positioned within a predetermined range including the in-focused position, and intermittently shifting the optical system in the direction of optical axis with a second moving step larger than the first moving step in the case of decision from the compared result that the optical system is positioned outside the above predetermined range whereby the optical system is automatically moved to the in-focused position.

The third light receiving means comprises one photocell array arranged in a plane conjugated to the predetermined focal plane.

The third light receiving means comprises two photocell arrays arranged in the front and the rear of a plane conjugated to the predetermined focal plane.

The outputs of first, second, third and fourth photocell arrays are arithmetically operated in accordance with respective given evaluation functions thereby obtaining first, second, third and fourth evaluation values referred to as $F_1'$, $F_2'$, $F_3'$ and $F_4'$, the change-over points of first and second moving steps are determined by magnitude relation of the values $F_1'$, $F_2'$, $F_3'$ and $F_4'$, and the in-focused condition is determined by magnitude relation of the value $|F_1-F_2|$ or $|F_3-F_4|$ and $H_0$, respectively.

BRIEF DESCRIPTION OF THE DRAWINGS

FIG. 1 is a block diagram showing a fundamental construction of an automatic focus adjusting method;

FIG. 2 is a sectional view showing an optical system of a device for carrying out the conventional automatic focus adjusting method;

FIG. 9 is a sectional view showing an optical system of other embodiment of an automatic focus adjusting device for carrying out a method of automatically adjusting focusing conditions according to the present invention; and FIG. 10 is a schematic diagram illustrating evaluation value to the lens position obtained from the output of photocell array shown in FIG. 9.

DESCRIPTION OF THE PREFERRED EMBODIMENT

Figure 3:
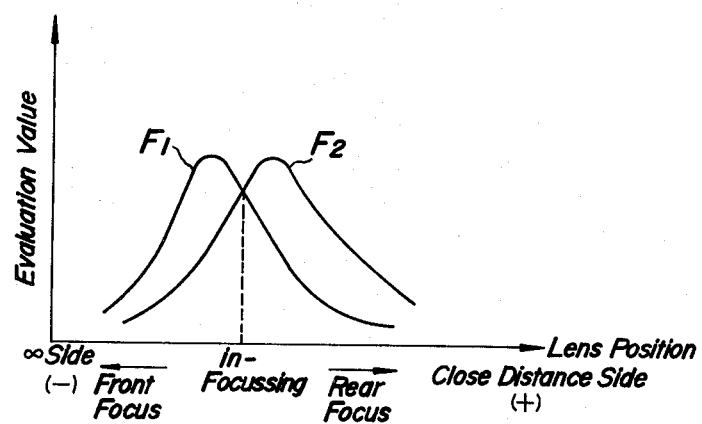
FIG. 3 is a schematic diagram illustrating evaluation value to the lens position obtained from the output of photocell array shown in FIG. 2.
Figure 4:
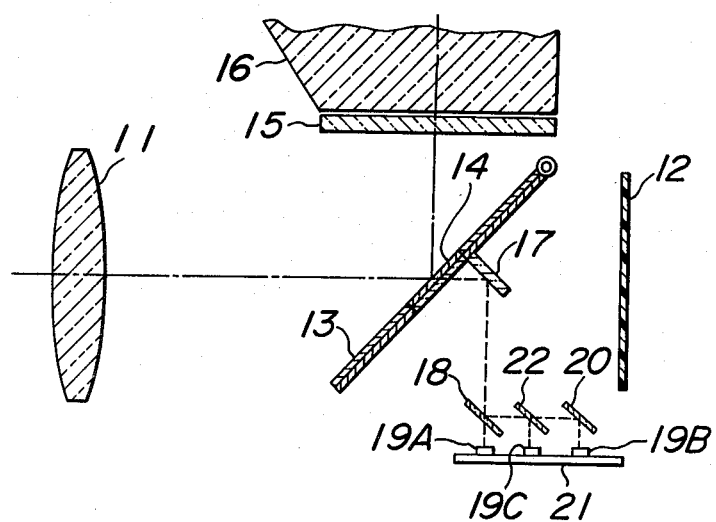
FIG. 4 is a sectional view showing an optical system of an automatic focus adjusting device for carrying out a method of automatically adjusting focusing condition according to the present invention.

FIG. 4 is a schematic diagram showing a construction of one embodiment of an optical system of the device for carrying out a method of automatically adjusting focus conditions according to the present invention. In this embodiment the construction of the device is substantially similar to that of the device shown in FIG. 2 except that a half mirror 22 is arranged in the optical path between the half mirror 18 and the total reflection mirror 20 and arranged in parallel thereto, the right beam reflected by the half mirror 22 is projected onto an array of light receiving elements 19C such as photocells which are arranged at a surface optically conjugated to the film 12 on the same substrate 21 on which the photocell arrays 19A and 19B are arranged. Like reference numerals shown in FIG. 2 designate like or functionally equivalent parts.

Figure 5:
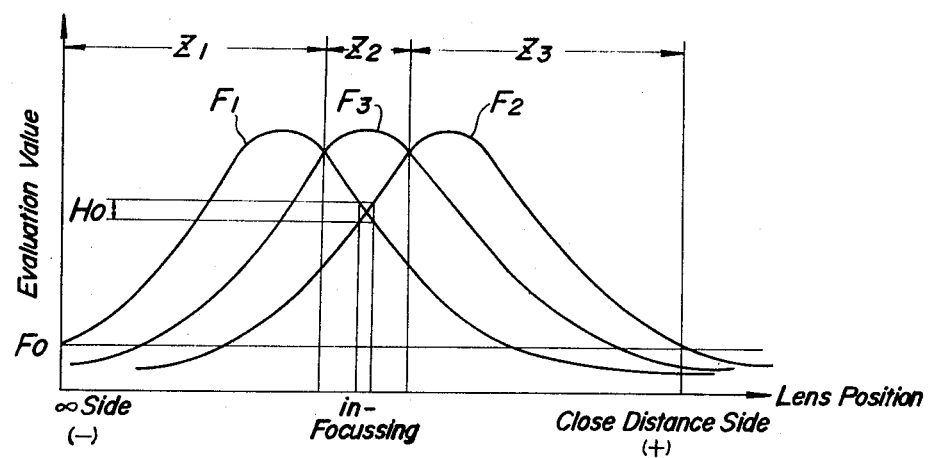
FIG. 5 is a schematic diagram illustrating evaluation value to the lens position obtained from the output of photocell array shown in FIG. 4.

Outputs of these photocell arrays 19A, 19B and 19C are arithmetically operated respectively based on the same evaluation function thereby obtaining respective evaluation values which represents defocused amount of the image to respective lens positions. Thus obtained evaluation values are shown in FIG. 5 by curves $F_1$, $F_2$ and $F_3$. In this embodiment according to amount of these evaluation values the moving range of the lens is classified into three zones, that is, a zone $Z_1$ within a range of $F_1 > F_3$, a zone $Z_2$ within ranges of $F_1 < F_3$ and $F_2 < F_3$ and a zone $Z_3$ within a range of $F_2 > F_3$. The moving amount ($\alpha$) for one step of lens moving in zones $Z_1$ and $Z_3$ is made larger than the moving amount ($\beta$) for one step of lens moving in the zone $Z_2$. The moving amount $\alpha$ in zones $Z_1$ and $Z_3$ can be made about 1/2 because the distance between peak values of evaluation values $F_1$ and $F_2$ is a difference (l) of the optical path of photocell arrays 19A and 19B, and the width of the zone $Z_2$ is about one half of the optical path difference l. The moving amount $\beta$ in the zone $Z_2$ can be made within the focal depth as described above. The lens 11 may be moved in the direction of close distance side (+) in the case of $F_1 > F_3$ and may be moved in the direction of ∞ side (−) in the case of $F_2 > F_3$ in zones $Z_1$ and $Z_3$. The lens 11 also may be moved in the direction of (+) side in the case of $F_1 > F_2$ and moved in the direction of (−) side in the case of $F_1 < F_2$ according to the comparison of $F_1$ and $F_2$ in the zone $Z_2$.

Figure 6:
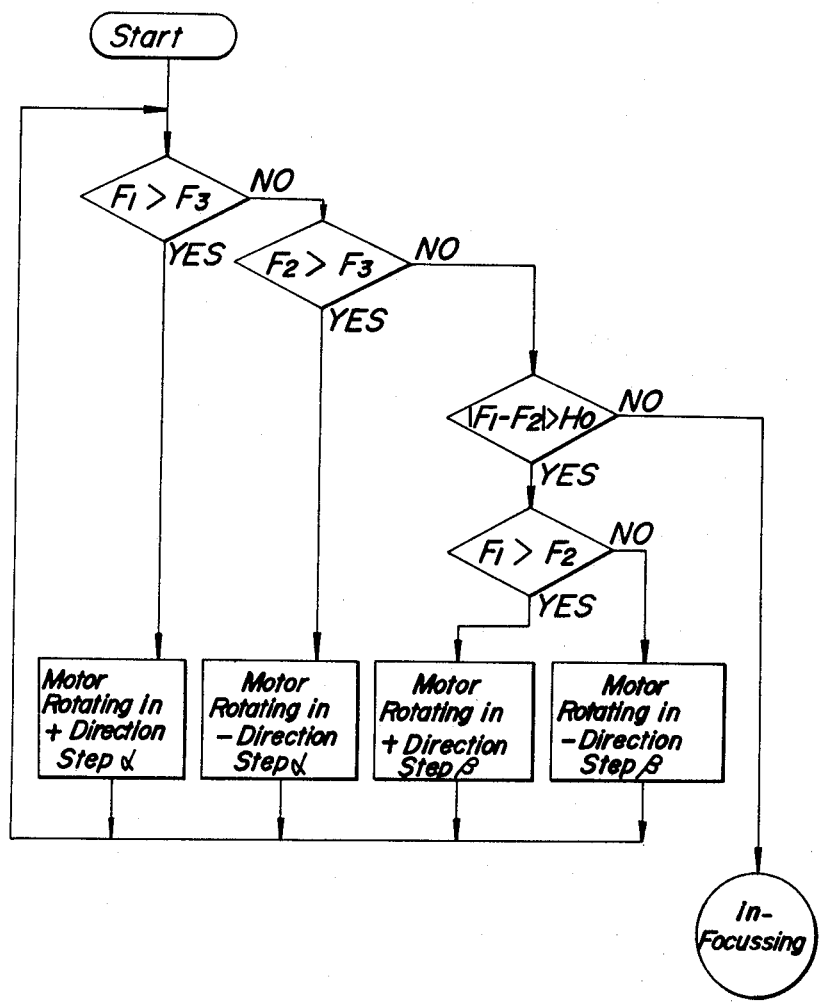
FIG. 6 is a flow chart explaining an operation of one embodiment of the method according to the present invention.

One embodiment of the method according to the present invention is applied with reference to evaluation value curve shown in FIG. 5 and a flow chart shown in FIG. 6. At first, evaluation values $F_1$ and $F_3$ are compared. In the case of $F_1 > F_3$, that is, the position of the lens 11 at the zone $Z_1$ (see FIG. 4), the lens 11 is moved with $\alpha$ step in the (+) direction through a lens driving motor. In the case of $F_1 < F_3$, the evaluation values $F_2$ and $F_3$ are compared. In this comparison when $F_2 > F_3$, that is, the lens 11 is positioned at the zone $Z_3$, the lens 11 is moved with $\alpha$ step in the direction of ∞ side and the evaluation values $F_1$, $F_2$ and $F_3$ are again obtained. When $F_1 < F_3$ and $F_2 < F_3$, that is, the lens 11 is positioned at the zone $Z_2$, $|F_1-F_2|$ is compared with an in-focused allowance $H_0$. When $|F_1-F_2| > H_0$ evaluation values $F_1$ and $F_2$ are further compared. In this comparison when $F_1 > F_2$ the lens 11 is moved with $\beta$ step in the (+) direction through the lens drive motor and when $F_1 < F_2$ the lens 11 is moved with $\beta$ step in the direction of ($-$) side thereby again obtaining evaluation values $F_1$, $F_2$ and $F_3$. The above described operations are repeated until evaluation values have following relations; $F_1 < F_3$, $F_2 < F_3$ and $|F_1 - F_2| \leq H_0$. Thus, the lens 11 can be automatically adjusted to the in-focusing positions.

Provided that in FIG. 4 the difference l of optical path between the photocell arrays 19A and 19B is 1 mm, lens moving amount $\alpha$ in zones $Z_1$ and $Z_3$ and lens moving amount $\beta$ in zone $Z_2$ in case of using the above standard lens as the lens 11 are 0.5 mm and 70 $\mu$m, respectively. When the lens 11 is positioned at $\infty$ side and the in-focusing conditions is obtained at the position apart from $\infty$ side by 7.2 mm, the range of zone $Z_1$ is from $\infty$ position to the position shorter than by $1/4 = 0.25$ mm from the in-focusing position, that is, 6.95 mm so that the lens 11 must be moved by 14 step in order to enter the lens 11 in the zone $Z_2$ from the $\infty$ position thereby obtaining a movement of 7.0 mm. In the zone $Z_2$ the lens 11 is moved to positions of 7.07 mm, 7.14 mm and 7.21 mm in turn, by three stepwise movements so that the lens 11 is finally positioned to the in-focused position within focal depth by sum of 17 times of focusing condition decisions and then focusing operation is completed. The time required to complete the focusing cycle, in this case, takes $14 \times 0.12 + 3 \times 0.31 = 1.98$ sec when one cycle of decision time including step moving time of lens is made 120 ms in the zone $Z_1$ and 100 ms in the zone $Z_2$ so that the method according to the present invention can perform in-focus adjusting with very short time as compared with the conventional method.

Figure 7:
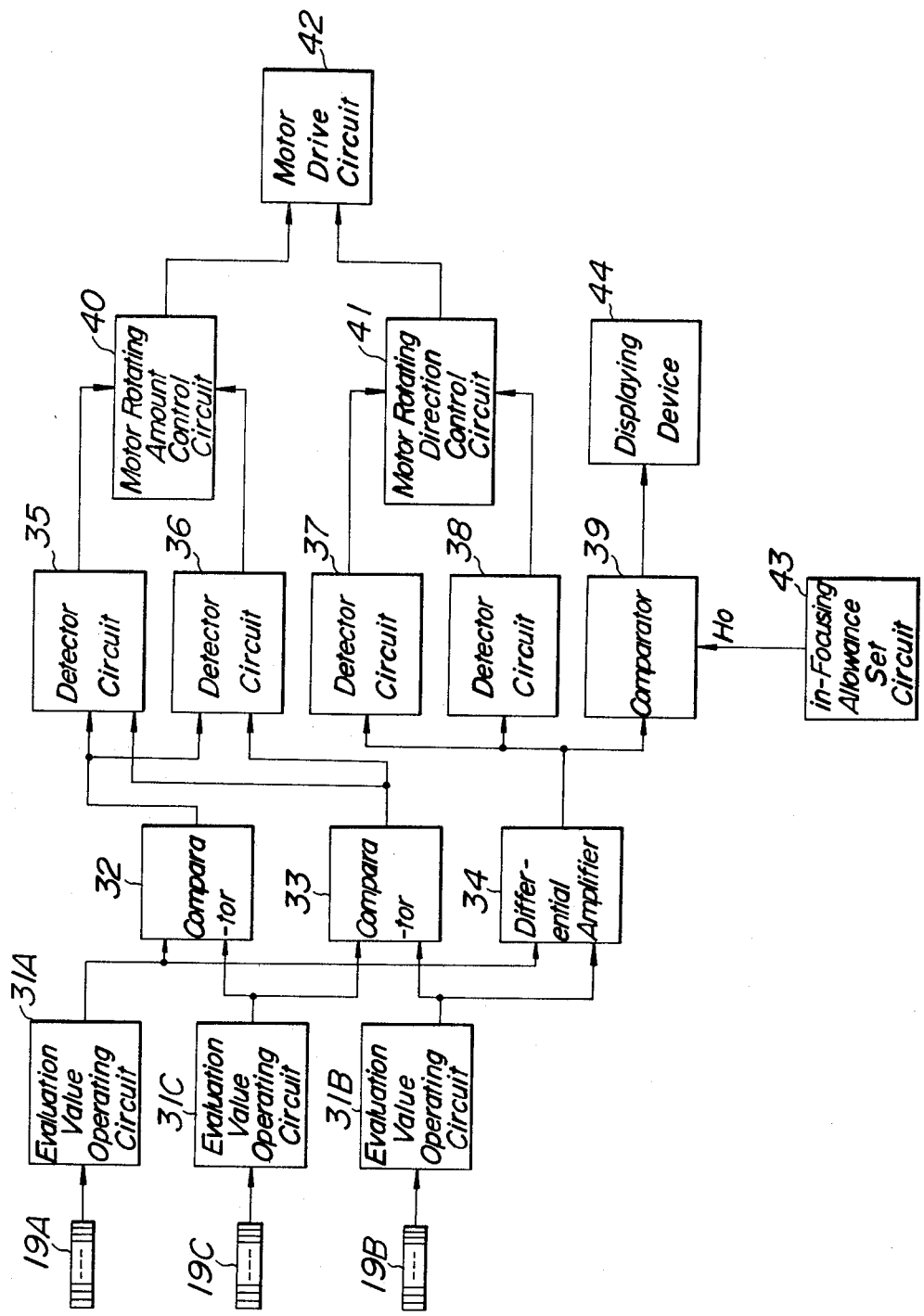
FIG. 7 is a block diagram showing a circuit construction of one embodiment of the automatic focus adjusting device for carrying out the method according to the present invention.

FIG. 7 is a block diagram showing a construction of one embodiment of automatic focus detecting device for carrying out the method according to the present invention. On the photocell arrays 19A, 19B and 19C there are formed substantially same images by the optical system shown in FIG. 4. In this embodiment outputs of respective photocell arrays are supplied to corresponding evaluation value operating circuits 31A, 31B and 31C, respectively, to obtain respective evaluation values $F_1$, $F_2$ and $F_3$ by the arithmetic operation with the predetermined same evaluation function. Evaluation values $F_1$ and $F_3$ are supplied to a comparator 32, $F_2$ and $F_3$ a comparator 33 and $F_1$ and $F_2$ a differential amplifier 34, respectively. Outputs of the comparators 32 and 33 supplied to detector circuits 35 and 36, respectively, and output of the differential amplifier 34 is supplied to detector circuits 37 and 38 and a comparator 39, respectively.

When $F_3 > F_1$ and $F_3 > F_2$, that is the lens 11 is positioned at the zone $Z_2$ (see FIG. 4) the detector circuit 35 supplies a control signal with lens moving amount $\beta$ to a circuit 40 for controlling motor rotating amount. When $F_1 > F_3$ or $F_2 > F_3$, that is, the lens 11 is positioned at the zone $Z_1$ or $Z_3$ the detector circuit 36 supplies a control signal with lens moving amount $\alpha$ to the circuit 40. When $F_1 - F_2 > 0$ at the output side of the amplifier 34 the detector circuit 37 supplies to a circuit 41 for controlling motor rotating direction a control signal, by which the lens 11 can be moved in the direction of close distance side ($+$ direction). When $F_1 - F_2 < 0$ the detector circuit 38 supplies to the circuit 41 a control signal, by which the lens 11 can be moved in the direction of the $\infty$ side ($-$ direction).

The motor rotating amount control circuit 40 and the motor rotating direction control circuit 41 supply signals representing respective set rotating amount and rotating direction of motor to a motor drive circuit 42 thereby moving the lens 11 by predetermined amount in the predetermined direction through a lens driving motor (not shown).

The comparator 39 compares an absolute value $|F_1 - F_2|$ of output of the differential amplifier 34 with the in-focusing allowance $H_0$ thereby performing in-focusing display in a display unit 44 in the case of $|F_1 - F_2| < H_0$ according to the compared result and performing defocusing display in the unit 44 in the case of $|F_1 - F_2| > H_0$.

In this embodiment, that is, the moving amount $\alpha$ is selected in the case of $F_1 > F_3$ or $F_2 > F_3$ and the moving amount $\beta$ is selected in the case of $F_3 > F_1$ and $F_3 > F_2$ and then the moving direction is determined in accordance with the polarity of $F_1 - F_2$.

Figure 8:
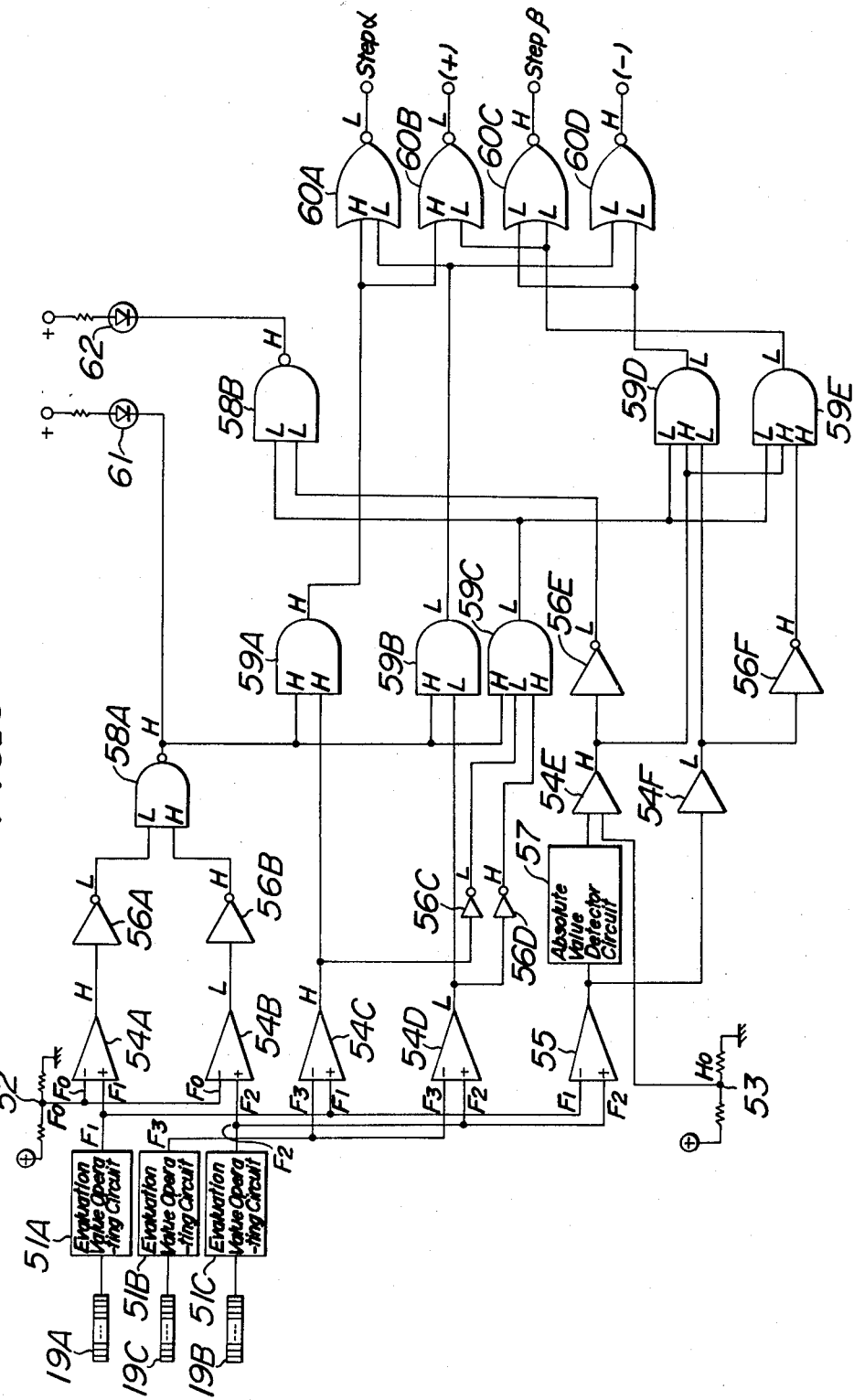
FIG. 8 is a diagram showing circuit construction of another embodiment of the device according to the present invention.

FIG. 8 is a block diagram showing a construction of another embodiment of the automatic focus adjusting device for carrying out the method according to the present invention. In this embodiment when the lens 11 is too separated from the in-focused position thereby performing erroneous in-focusing decision being $|F_1 - F_2| \leq 0$ due to noises, this erroneous in-focusing decision can be prevented. To this end a decision threshold value $F_0$ (see FIG. 5) is set and in-focusing impossible is displayed in case of decreasing evaluation values $F_1$ and $F_2$ than the threshold value $F_0$ without performing focus adjustment.

In this embodiment the automatic focus adjusting device comprises photocell arrays 19A to 19C, evaluation value operating circuits 51A to 51C, a decision threshold value set circuit 52, an in-focusing allowance set circuit 53, saturation comparators 54A to 54F, a comparator 55, inverters 56A to 56F, an absolute value detector circuit 57, NAND circuits 58A, 58B, AND circuits 59A to 59E, NOR circuits 60A to 60D, an in-focusing impossible display light emitting element 61 and an in-focusing display light emitting element 62 which are connected as shown in FIG. 8. When $F_0 > F_1$ and $F_0 > F_2$, the device makes the output of the NAND circuit 58A L (low) level thereby indicating in-focusing impossible with emission of the light emitting element 61 and makes all outputs of NOR circuits 60A to 60D H (high) level thereby stopping the lens drive motor. Logic states H and L of each circuit shown in FIG. 8 indicate conditions that in FIG. 5 the lens 11 is positioned in the zone $Z_1$ which satisfies $F_1 > F_0$, $F_2 < F_0$, $F_1 > F_3$, $F_2 < F_3$ and $F_1 > F_2$. Under this conditions outputs of NAND circuit 58A, 58B become H level resulting in non-emission of elements 61 and 62. At the same time outputs of NOR circuits 60A and 60B become L level and outputs of NOR circuits 60C and 60D become H level so that the lens 11 is moved or shifted in $+$ direction by one pitch with moving amount $\alpha$. When the lens 11 is positioned in the zone $Z_3$ which satisfies $F_2 > F_0$, $F_1 < F_3$, $F_2 > F_3$, $F_1 < F_2$ outputs of NOR circuits 60A and 60D become L level and outputs of NOR circuits 60B and 60C become H level so that the lens 11 is shifted in $-$ direction by one pitch with moving amount $\alpha$. When the lens 11 is positioned in the zone $Z_2$ under the condition $|F_1 - F_2| > H_0$ the output of NOR circuit 60A becomes H level and the output of NOR circuit 60C becomes L level, while any one of outputs of NOR circuits 60B and 60D becomes L level in accordance with compared result of $F_1 > F_3$, $F_2 > F_3$ and $F_1 > F_2$ so that the lens 11 is shifted in $+$ or $-$ direction by one pitch with moving amount $\beta$. While under the condition $|F_1-F_2|<H_0$ the output of NAND circuit 58B becomes L level resulting in emission of the element 62 thereby indicating in-focusing condition and all outputs of NOR circuits 60A to 60D become H level thereby stopping the lens drive motor.

FIG. 9 is a schematic sectional view showing construction of other optical system of the automatic focus adjusting device for carrying out the method according to the present invention. The construction of the device is substantially similar to that of the device shown in FIG. 4 except that half mirrors 71 and 72 are arranged in the optical path between the half mirror 18 and the total reflection mirror 20 and arranged in parallel thereto, the light beam reflected by the half mirrors 71 and 72 is projected onto arrays of light receiving elements 19C and 19D which are arranged in the front and the rear of a surface optically conjugated to the film 12 on the same substrate 21 on which the photocell arrays 19A and 19B are arranged. In FIG. 9 like reference numerals designate like or functionally equivalent parts shown in FIG. 4. In this case outputs of four photocell arrays 19A, 19B, 19C and 19D are arithmetically operated respectively based on the same evaluation function thereby obtaining respective evaluation values which represent defocused amount of image to respective lens position. These evaluation values are shown in FIG. 10 by curves $F_1$, $F_2$, $F_3$ and $F_4$. In this embodiment according to amount of these evaluation values the moving range of the lens is classified into three zones, that is, a zone $Z_1$ within a range of $F_1>F_3$, a zone $Z_2$ within ranges of $F_1<F_3$ and $F_2<F_4$ and a zone $Z_3$ within a range of $F_2>F_4$. The moving amount ($\alpha$) for one step of lens moving in zones $Z_1$ and $Z_3$ is made larger than the moving amount ($\beta$) for one step of lens movement in the zone $Z_2$. The in-focused condition may be decided when $|F_1-F_2|\leq H_0$ and/or $|F_3-F_4|\leq H_0$ in the zone $Z_2$.

Such an automatic focus adjusting device performed by determining lens moving amount $\alpha$, $\beta$ and lens moving direction with the use of four photocell arrays 19A to 19D can easily be realized by changing a part of the circuit shown in FIG. 8.

The invention is not limited to the above mentioned embodiments only, but various changes and alternations are possible. For example, in the embodiment shown in FIG. 9 the difference of optical path between photocell arrays 19A and 19B and the difference of optical path between photocell arrays 19C and 19D may be properly set in accordance with lens to be used, for example, in such a manner that in the case of a telephoto lens having large moving distance the difference is made larger than that of the standard lens. Only one photocell array is arranged at a surface conjugated to a predetermined focal plane or two photocell arrays are arranged in the front and the rear of the conjugate plane and thus these photocell arrays may be selected in accordance with the lens to be used, for example, an interchangeable lens in the case of a single-lens reflex camera.

According to the present invention as described above it is decided whether the lens is positioned near or far the in-focused position, if the lens is positioned far the in-focused position the lens moving amount for one step is made large, and if the lens is positioned near the in-focused position the lens moving amount for one step is made small, for example, within the focal depth so that the photographic optical system can be automatically adjusted at the in-focused position with very short time.

What is claimed is:

1. A method of automatically adjusting focus conditions comprising
    receiving at least a part of an optical image formed on a predetermined focal plane by an optical system onto first and second light receiving means each including photocell array arranged in the front and the rear of a surface conjugated to the predetermined focal plane and onto a third light receiving means arranged between the first and second light receiving means, respectively,
    arithmetically operating outputs of first, second and third light receiving means in accordance with respective given evaluation functions thereby obtaining first, second and third evaluation values,
    comparing first, second and third evaluation values with each other,
    intermittently shifting or moving the optical system in the direction of optical axis with a first moving step in the case of decision from the compared result that the optical system is positioned within a predetermined range including the in-focused position, and
    intermittently shifting the optical system in the direction of optical axis with a second moving step larger than the first moving step in the case of decision from the compared result that the optical system is positioned outside the above predetermined range, whereby the optical system is automatically moved to the in-focused position.

2. A method of automatically adjusting focus conditions as claimed in claim 1, wherein the third light receiving means comprises one photocell array arranged in a plane conjugated to the predetermined focal plane.

3. A method of automatically adjusting focus conditions as claimed in claim 1, wherein the third light receiving means comprises two photocell arrays arranged in the front and the rear of a plane conjugated to the predetermined focal plane.

4. A method of automatically adjusting focus conditions as claimed in claim 2, wherein the first, second and third evaluation values are referred to as $F_1$, $F_2$ and $F_3$, respectively, and the change-over points of the first and second moving steps are determined by magnitude relation of $F_1$, $F_2$ and $F_3$.

5. A method of automatically adjusting focus conditions as claimed in claim 4, wherein evaluation values $F_1$ and $F_2$ are compared with each other, and when the value $F_3$ is smaller than the value $F_1$ the optical system is shifted in a first direction with the second moving step $\alpha$.

6. A method of automatically adjusting focus conditions as claimed in claim 4, wherein in the case of the evaluation value $F_3$ larger than the evaluation value $F_1$, evaluation values $F_2$ and $F_3$ are compared with each other and when the evaluation value $F_3$ is smaller than the value $F_2$ the optical system is shifted in a second direction with the second moving step $\alpha$.

7. A method of automatically adjusting focus conditions as claimed in clam 6, wherein in the case of the value $F_3$ larger than the value $F_2$, the value $|F_1-F_2|$ and a reference value $H_0$ are compared with each other and when the value $|F_1-F_2|$ is smaller than the value $H_0$ this condition is determined as the in-focused condition.

8. A method of automatically adjusting focus conditions as claimed in claim 7, wherein in the case of the value $|F_1-F_2|$ larger than the value $H_0$, evaluation values $F_1$ and $F_2$ are compared with each other, when the value $F_1$ is larger than the value $F_2$ the optical system is shifted in the first direction with the first moving step, and when the value $F_1$ is smaller than the value $F_2$ the optical system is shifted in the second direction with the first moving step.

9. A method of automatically adjusting focus conditions as claimed in claim 1, wherein the first moving step $\beta$ is 70 $\mu$m and the second moving step $\alpha$ is 0.5 mm.

10. A method of automatically adjusting focus conditions as claimed in claim 3, wherein outputs of first, second, third and fourth photocell arrays are arithmetically operated in accordance with respective given evaluation functions thereby obtaining first, second, third and fourth evaluation values referred to as $F_1'$, $F_2'$, $F_3'$ and $F_4'$, the change-over points of first and second moving steps are determined by magnitude relation of the values $F_1'$, $F_2'$, $F_3'$ and $F_4'$, and the in-focused condition is determined by magnitude relation of the value $|F_1-F_2|$ or $|F_3-F_4|$ and $H_0$, respectively.

11. A method of automatically adjusting focus conditions as claimed in claim 7, wherein the reference value $H_0$ is determined by the magnitude of the first moving step $\beta$.

12. A method of automatically adjusting focus conditions as claimed in claim 1, wherein the first moving step $\beta$ is determined based on a focal depth of the optical system.

* * * * *